US012619010B2

(12) United States Patent
Yun et al.

(10) Patent No.: US 12,619,010 B2
(45) Date of Patent: May 5, 2026

(54) OPTICAL MULTILAYER STRUCTURE AND METHOD OF MANUFACTURING THE SAME

(71) Applicant: SK Innovation Co., Ltd., Seoul (KR)

(72) Inventors: Cheol Min Yun, Daejeon (KR); Chun Ho Kim, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 211 days.

(21) Appl. No.: 18/201,236

(22) Filed: May 24, 2023

(65) Prior Publication Data

US 2024/0019607 A1 Jan. 18, 2024

(30) Foreign Application Priority Data

May 25, 2022 (KR) ........................ 10-2022-0063876
Apr. 25, 2023 (KR) ........................ 10-2023-0054300

(51) Int. Cl.
*G02B 1/14* (2015.01)
*B32B 17/10* (2006.01)
*B32B 27/28* (2006.01)

(52) U.S. Cl.
CPC ................ *G02B 1/14* (2015.01); *B32B 17/10* (2013.01); *B32B 27/281* (2013.01); (Continued)

(58) Field of Classification Search
CPC .............. C08G 73/106; C08G 73/1032; C08G 73/1042; C08G 73/1082; C08J 5/18; (Continued)

(56) References Cited

U.S. PATENT DOCUMENTS 6,815,070 B1 11/2004 Burkle et al.
7,410,686 B2 8/2008 Osada et al.
(Continued)

FOREIGN PATENT DOCUMENTS

JP 2006182854 A 7/2006
JP 2016037048 A * 3/2016
(Continued)

*Primary Examiner* — John D Freeman
(74) *Attorney, Agent, or Firm* — The Webb Law Firm

(57) ABSTRACT

An optical multilayer structure including a substrate; a shatterproof layer which is formed on at least one surface of the substrate and includes a polyimide film including a polyimide precursor, a polyimide, or a combination thereof including a structure of the following Chemical Formula 1, and inorganic particles; and a hard coating layer formed on the other surface of the substrate:

[Chemical Formula 1]

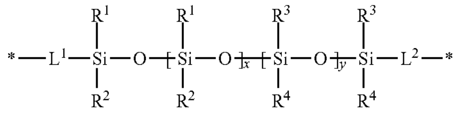

wherein $R^1$ and $R^2$ are independently of each other $C_{1-5}$ alkyl which is unsubstituted or substituted with one or more halogens; $R^3$ and $R^4$ are independently of each other $C_{6-10}$ aryl which is unsubstituted or substituted with one or more halogens; $L^1$ and $L^2$ are independently of each other $C_{1-10}$ alkylene; and x and y are independently of each other an integer of 1 or more.

14 Claims, 1 Drawing Sheet

(52) U.S. Cl.
CPC ..... *B32B 2255/26* (2013.01); *B32B 2307/412* (2013.01); *B32B 2307/536* (2013.01); *B32B 2307/558* (2013.01); *B32B 2457/20* (2013.01)

(58) Field of Classification Search
CPC ...... C08J 2379/08; C09D 7/20; C09D 179/08; C08L 79/08; G02B 1/14; G02B 1/002; B32B 17/10; B32B 27/281; B32B 2255/26; B32B 2307/412; B32B 2307/536; B32B 2307/558; B32B 2457/20
See application file for complete search history.

(56) References Cited

U.S. PATENT DOCUMENTS

| | | | |
|---|---|---|---|
| 10,688,756 | B2 | 6/2020 | Chu et al. |
| 10,964,898 | B2 | 3/2021 | Seki et al. |
| 11,161,323 | B2 | 11/2021 | Choi et al. |
| 2012/0196103 | A1 | 8/2012 | Murashige et al. |
| 2013/0186548 | A1 | 7/2013 | Takao et al. |
| 2015/0002760 | A1 | 1/2015 | Morimoto et al. |
| 2015/0072125 | A1 | 3/2015 | Murashige et al. |
| 2016/0002103 | A1 | 1/2016 | Wang et al. |
| 2016/0075110 | A1 | 3/2016 | Kakuta et al. |
| 2017/0298249 | A1 | 10/2017 | Lin et al. |
| 2018/0034001 | A1 | 2/2018 | Hwang et al. |
| 2019/0345332 | A1 | 11/2019 | Shimada et al. |
| 2020/0040152 | A1 | 2/2020 | Yun et al. |
| 2020/0133342 | A1 | 4/2020 | Choi et al. |
| 2020/0147945 | A1 | 5/2020 | Kourtakis et al. |
| 2020/0174161 | A1 | 6/2020 | Ahn et al. |
| 2020/0198302 | A1 | 6/2020 | Murashige et al. |
| 2020/0292731 | A1 | 9/2020 | Park et al. |
| 2020/0342789 | A1 | 10/2020 | Park et al. |
| 2021/0002947 | A1 | 1/2021 | Park et al. |
| 2021/0096280 | A1* | 4/2021 | Kim ........................ G02B 1/14 |
| 2021/0403769 | A1 | 12/2021 | Kiyoto |

FOREIGN PATENT DOCUMENTS

| | | | | | |
|---|---|---|---|---|---|
| JP | 6350163 | B2 | | 7/2018 | |
| JP | 2019504812 | A | | 2/2019 | |
| JP | 2019119779 | A | | 7/2019 | |
| JP | 202020960 | A | | 2/2020 | |
| JP | 2021026232 | A | * | 2/2021 | ........ G02F 1/133514 |
| KR | 100489727 | B1 | | 5/2005 | |
| KR | 1020050106538 | A | | 11/2005 | |
| KR | 100884917 | B1 | | 2/2009 | |
| KR | 1020120016906 | A | | 2/2012 | |
| KR | 101238214 | B1 | | 3/2013 | |
| KR | 1020130084102 | A | | 7/2013 | |
| KR | 1020130117464 | A | | 10/2013 | |
| KR | 1020150037381 | A | | 4/2015 | |
| KR | 1020160014614 | A | | 2/2016 | |
| KR | 1020160117867 | A | | 10/2016 | |
| KR | 101787941 | B1 | | 10/2017 | |
| KR | 1020170113815 | A | | 10/2017 | |
| KR | 1020180012913 | A | | 2/2018 | |
| KR | 101835933 | B1 | | 3/2018 | |
| KR | 1020180039219 | A | | 4/2018 | |
| KR | 1020190018114 | A | | 2/2019 | |
| KR | 1020190059010 | A | | 5/2019 | |
| KR | 101993652 | B1 | | 9/2019 | |
| KR | 102068685 | B1 | | 1/2020 | |
| KR | 102068729 | B1 | | 1/2020 | |
| KR | 1020200005672 | A | | 1/2020 | |
| KR | 1020200016797 | A | | 2/2020 | |
| KR | 102102688 | B1 | | 4/2020 | |
| KR | 1020200040137 | A | | 4/2020 | |
| KR | 1020200049942 | A | | 5/2020 | |
| KR | 102147297 | B1 | | 8/2020 | |
| KR | 1020200098382 | A | | 8/2020 | |
| WO | WO-2013047451 | A1 | * | 4/2013 | ........... C09D 179/08 |
| WO | WO-2017221776 | A1 | * | 12/2017 | ............ C08G 73/10 |

* cited by examiner

OPTICAL MULTILAYER STRUCTURE AND METHOD OF MANUFACTURING THE SAME

CROSS-REFERENCE TO RELATED APPLICATIONS

This application claims priority to Korean Patent Application No. 10-2022-0063876, filed May 25, 2022, Korean Patent Application No. 10-2022-0063866, filed May 25, 2022, and Korean Patent Application No. 10-2023-0054300, filed Apr. 25, 2023, the disclosures of each of which are hereby incorporated by reference in their entireties.

BACKGROUND OF THE INVENTION

Field of the Invention

The following disclosure relates to an optical multilayer structure and a method of manufacturing the same.

Description of Related Art

A polyimide film is a material for a substrate, a cover window, and the like of a display device, and is attracting attention as a next-generation material which may replace tempered glass. In order to apply a film to a display device, it is essential to improve intrinsic yellow index characteristics and impart colorless and transparent characteristics, and furthermore, in order to make the film applicable to a foldable or flexible display device, mechanical properties should be also improved, and thus, the required performance of the polyimide film for a display device is gradually increased.

In particular, it is important to design a flexible display device which may be bent or folded when the user wants as a flexible structure so that the device is not easily broken upon external impact or during a bending or folding process.

SUMMARY OF THE INVENTION

An embodiment of the present disclosure is directed to providing a multilayer structure comprising: a structure comprising a polyimide shatterproof layer having a relaxed thermal expansion-shrinkage behavior formed on one surface of a substrate and a hard coating layer formed on the other surface of the substrate; or a structure in which the shatterproof layers are formed on both surfaces of the substrate, wherein curling is excellently improved and surface hardness is significantly increased.

Another embodiment of the present disclosure is directed to providing a method of manufacturing the optical multilayer structure.

Still another embodiment of the present disclosure is directed to providing a window cover film comprising the optical multilayer structure and a flexible display panel comprising the same.

In one general aspect, an optical multilayer structure comprises:

a substrate;

a shatterproof layer which is formed on one surface of the substrate and comprises a polyimide film comprising a polyimide precursor, a polyimide, or a combination thereof comprising a structure of the following Chemical Formula 1, and inorganic particles; and a hard coating layer formed on the other surface of the substrate:

[Chemical Formula 1]

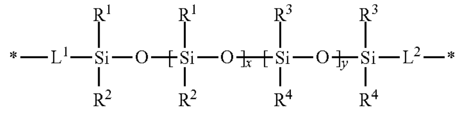

wherein $R^4$ and $R^2$ are independently of each other $C_{1-5}$ alkyl which is unsubstituted or substituted with one or more halogens;

$R^3$ and $R^4$ are independently of each other $C_{6-10}$ aryl which is unsubstituted or substituted with one or more halogens;

$L^4$ and $L^2$ are independently of each other $C_{1-10}$ alkylene; and x and y are independently of each other an integer of 1 or more.

In one embodiment, the optical multilayer structure may further comprise a shatterproof layer between the substrate and the hard coating layer.

In another general aspect, a method of manufacturing the optical multilayer structure according to the implementation comprises: applying a polyimide precursor composition on one surface of a substrate and drying the composition to form a shatterproof layer; and applying a composition for forming a hard coating layer on the other surface of the substrate and curing the composition to form a hard coating layer.

In another general aspect, a method of manufacturing the optical multilayer structure according to the implementation comprises: applying a polyimide precursor composition on both surfaces of a substrate (the one surface of the substrate and the other surface of the substrate) and drying the composition to form a first shatterproof layer on the one surface of the substrate and a second shatterproof layer on the other surface of the substrate; and applying a composition for forming a hard coating layer on any one of the first shatterproof layer or the second shatterproof layer formed on the substrate and curing the composition to form a hard coating layer.

In another general aspect, a window cover film comprises the optical multilayer structure according to the implementation.

In still another general aspect, a flexible display panel comprises the window cover film according to the implementation.

Other features and aspects will be apparent from the following detailed description, the drawings, and the claims.

Detailed Description of Main Elements

Figure 1:
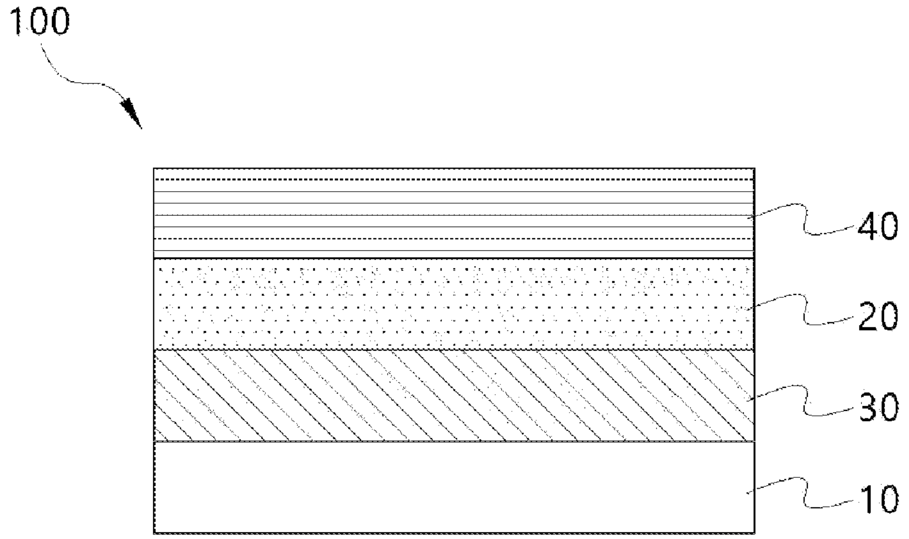
FIGS. 1 and 2 schematically show a structure of an optical multilayer structure according to one implementation.

100: Optical multilayer structure
10: Display element
20: Substrate
30: Shatterproof layer
40: Hard coating layer

DESCRIPTION OF THE INVENTION

The embodiments described in the present specification may be modified in many different forms, and the technology according to one embodiment is not limited to the embodiments set forth herein. Furthermore, throughout the specification, unless explicitly described to the contrary, "comprising" any constituent elements will be understood to imply further inclusion of other constituent elements.

The numerical range used in the present specification comprises all values within the range comprising the lower limit and the upper limit, increments logically derived in a form and spanning in a defined range, all double limited values, and all possible combinations of the upper limit and the lower limit in the numerical range defined in different forms. As an example, when it is defined that a content of a composition is 10% to 80% or 20% to 50%, it should be interpreted that a numerical range of 10% to 50% or 50% to 80% is also described in the specification of the present. Unless otherwise defined in the present specification, values which may be outside a numerical range due to experimental error or rounding of a value are also comprised in the defined numerical range.

Hereinafter, unless otherwise particularly defined in the present specification, "about" may be considered as a value within 30%, 25%, 20%, 15%, 10%, or 5% of a stated value.

Hereinafter, unless otherwise particularly defined in the present specification, a "combination thereof" refers to mixing or copolymerization of constituents.

Hereinafter, unless otherwise particularly defined in the present specification, the term "A and/or B" in the present specification may refer to an embodiment comprising both A and B or an embodiment selecting one of A or B.

Hereinafter, unless otherwise particularly defined in the present specification, a "polymer" may comprise an oligomer and a polymer and may comprise a homopolymer and a copolymer. The copolymer may comprise a random copolymer, a block copolymer, a graft copolymer, an alternating copolymer, a gradient copolymer, or all of them.

Hereinafter, unless otherwise particularly defined in the present specification, a "polyamic acid" refers to a polymer comprising a structural unit comprising an amic acid moiety, and a "polyimide" may refer to a polymer comprising a structural unit comprising an imide moiety.

Hereinafter, unless otherwise particularly defined in the present specification, a polyimide film may be a film comprising a polyimide, and specifically, may be a high thermal resistant film manufactured by performing solution polymerization of an acid anhydride compound in a diamine compound solution to prepare a polyamic acid, and performing imidization.

Hereinafter, unless otherwise defined in the present specification, it will be understood that when an element such as a layer, a film, a thin film, a region, or a substrate is referred to as being "on" or "above" another element, it may be "directly on" the other element or intervening elements may also be present.

Hereinafter, unless otherwise particularly defined in the present specification, "substituted" refers to a hydrogen atom in a compound being substituted with a substituent, and for example, the substituent may be selected from deuterium, halogen atoms (F, Br, Cl, or I), a hydroxyl group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid or a salt thereof, a $C_{1-30}$ alkyl group, a $C_{2-30}$ alkenyl group, a $C_{2-30}$ alkynyl group, a $C_{6-30}$ aryl group, a $C_{7-30}$ arylalkyl group, a $C_{1-30}$ alkoxy group, a $C_{1-20}$ heteroalkyl group, a $C_{3-20}$ heteroarylalkyl group, a $C_{3-30}$ cycloalkyl group, a $C_{3-15}$ cycloalkenyl group, a $C_{6-15}$ cycloalkynyl group, a $C_{2-30}$ heterocyclic group, and/or a combination thereof.

An ultra-thin tempered glass (ultra thin glass, UTG) is a tempered glass material component used in a display cover window, and a method of coating a polyimide film for scattering resistant coating on UTG is known, but the problem of film curling in a drying step due to a difference in a thermal expansion coefficient between UTG and a polyimide film has not been solved. Meanwhile, a conventional material for improving curling has partially improved curling by introducing a flexible structure and the like, but surface hardness was significantly decreased due to the flexible properties. Thus, in one implementation, a stress relaxation segment is introduced into a polyimide precursor molecule, thereby providing a polyimide precursor which may minimize curling and also minimize a decrease in surface hardness when coated on UTG, and a composition comprising the same.

One implementation provides an optical multilayer structure comprising:

a substrate;

a shatterproof layer which is formed on one surface of the substrate and comprises a polyimide film comprising a polyimide precursor, a polyimide, or a combination thereof comprising a structure of the following Chemical Formula 1 (or a structure unit comprising the same), and inorganic particles; and a hard coating layer formed on the other surface of the substrate:

[Chemical Formula 1]

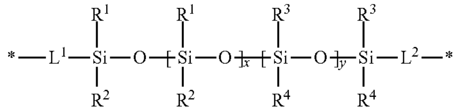

wherein $R^1$ and $R^2$ are independently of each other $C_{1-5}$ alkyl which is unsubstituted or substituted with one or more halogens;

$R^3$ and $R^4$ are independently of each other $C_{6-10}$ aryl which is unsubstituted or substituted with one or more halogens;

$L^1$ and $L^2$ are independently of each other $C_{1-10}$ alkylene; and x and y are independently of each other an integer of 1 or more.

In one embodiment, $R^1$ and $R^2$ may be independently of each other $C_{1-3}$ alkyl which is unsubstituted or substituted with one or more halogens, $C_{1-2}$ alkyl which is unsubstituted or substituted with one or more halogens, or methyl which is unsubstituted or substituted with one or more halogens. Also, $R^3$ and $R^4$ may be independently of each other $C_{4-8}$ aryl which is unsubstituted or substituted with one or more halogens, $C_{6-8}$ aryl which is unsubstituted or substituted with one or more halogens, or phenyl which is unsubstituted or substituted with one or more halogens. Also, $L^1$ and $L^2$ may be independently of each other $C_{1-5}$ alkylene, $C_{2-5}$ alkylene, or propylene. The alkyl or the aryl substituted with one or more halogens may be substituted with one or more halogens selected from I, Br, Cl, and/or F.

In one embodiment, x and y may be independently of each other 1 to 100, 1 to 50, 1 to 30, or 1 to 20, but are not necessarily limited thereto. In addition, for example, when the sum of x and y is 100, x may be 1 to 99 and y may be 99 to 1, or x may be 10 to and y may be 90 to 10.

In one embodiment, the structure of Chemical Formula 1 comprises or may be a dimethylsiloxane-diphenylsiloxane (DMS-DPS) structure of the following Chemical Formula 3:

[Chemical Formula 3]

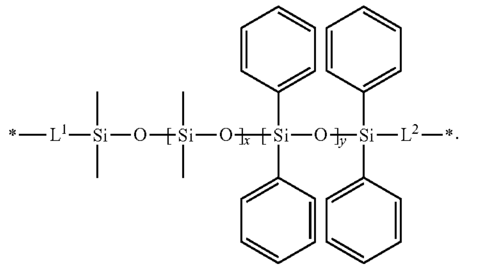

wherein $L^1$ and $L^2$ are independently of each other $C_{1-10}$ alkylene; and x and y are independently of each other an integer of 1 or more.

In one embodiment, the polyimide precursor, the polyimide, or the combination thereof may comprise a unit derived from a diamine comprising the structure represented by Chemical Formula 1. An example of the diamine comprising the structure of Chemical Formula 1 comprises X-22-1660B-3 available from Shin-etsu having the following structure:

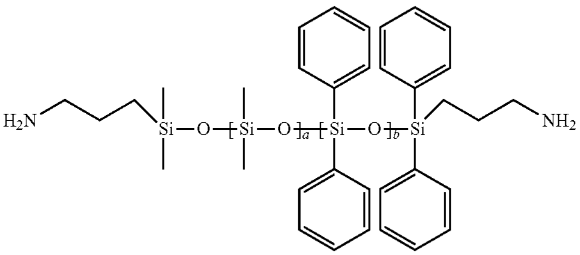

wherein a and b are independently of each other an integer of 1 or more, 1 to 50, 1 to 30, or 1 to 20, but is not necessarily limited thereto. Also, for example, when the sum of a and b is 100, a may be 1 to 99 and b may be 99 to 1, or a may be 10 to 90 and b may be 90 to 10.

The polyimide precursor, the polyimide, or the combination thereof comprises the structure of Chemical Formula 1, thereby minimizing curling due to a difference in thermal properties between different types of layers when an ultra-thin tempered glass is coated with it.

In one embodiment, the shatterproof layer may be formed from a polyimide precursor composition comprising the polyimide precursor, the polyimide, or the combination thereof, and the inorganic particles.

The polyimide precursor composition may comprise a solvent having a negative distribution coefficient and/or a solvent having a positive distribution coefficient. An example of the solvent having a negative distribution coefficient comprises propylene glycol methyl ether (PGME), dimethyl formamide (DMF), dimethyl acetamide (DMAc), N,N-dimethylpropanamide (DMPA), N-ethylpyrrolidone (NEP), and/or methylpyrrolidone (NMP). In addition, an example of the solvent having a positive distribution coefficient comprises cyclohexanone (CHN), N,N-diethylpropaneamide (DEPA), N,N-diethylacetamide (DEAc), and/or N,N-diethylformamide (DEF).

Without being limited to a certain theory, in one embodiment, the polyimide precursor composition uses a mixed solvent comprising both the solvent having a negative distribution coefficient and the solvent having a positive distribution coefficient, thereby effectively improving curling. Otherwise, in one embodiment, the composition uses both the solvent having a negative distribution coefficient and the solvent having a positive distribution coefficient, thereby significantly increasing the uniformity of the composition (solution) to improve cloudiness and phase separation, and thus, a colorless and transparent polyimide film may be manufactured therefrom. In addition, when a substrate is coated with a polyimide film by using both the solvent having a negative distribution coefficient and the solvent having a positive distribution coefficient, curling due to a difference in thermal properties between different types of layers may be minimized. However, since the solvent may be differently employed depending on the monomer of the polyimide precursor, the present disclosure is not necessarily limited to a specific solvent or a combination of solvents.

In one embodiment, when the solvent comprised in the polyimide precursor composition is a mixed solvent of the solvent having a negative distribution coefficient and the solvent having a positive distribution coefficient, a mass ratio between the solvent having a negative distribution coefficient and the solvent having a positive distribution coefficient may be 5:5 to 9.5:0.5. Otherwise, the mass ratio may be 5:5 to 9:1, 6:4 to 9:1, 6.5:3.5 to 9:1, 7:3 to 9:1, or 7.5:2.5 to 8.5:1.5, but is not necessarily limited thereto.

In one embodiment, the solvent comprised in the polyimide precursor composition may comprise at least one, specifically one or more, two or more, three or more, or 1 to 3 hydroxyl groups (—OH) in the molecule. Otherwise, the solvent may be a solvent comprising any one or more of an ether group (—O—) and an oxo group (=O).

In one embodiment, the unit comprising the structure of Chemical Formula 1 may be comprised at 20 wt % or more, 25 wt % or more, 30 wt % or more, 40 wt % or more, 20 wt % to 70 wt %, 20 wt % to wt %, 25 wt % to 60 wt %, 30 wt % to 55 wt %, or 20 wt % to 50 wt % with respect to the total weight of the polyimide precursor, but is not necessarily limited thereto.

In one embodiment, the unit comprising the structure of Chemical Formula 1 may be comprised at 30 wt % or more with respect to the total weight of the unit derived from the diamine comprised in the polyimide precursor. Otherwise, for example, it may be comprised at 40 wt % or more, 50 wt % or more, 60 wt % or more, 40 wt % to 90 wt %, 40 wt % to 80 wt %, or 40 wt % to 60 wt %, but is not necessarily limited thereto.

In one embodiment, the unit comprising the structure of Chemical Formula 1 may be comprised at 50 mol % to 99 mol %, 60 mol % to 99 mol %, 70 mol % to 99 mol %, 75 mol % to 99 mol %, 70 mol % to 95 mol %, 80 mol % to 95 mol %, 90 mol % to 95 mol %, or about 93 mol %, with respect to the total moles of the diamine in the monomer comprised in the polyimide precursor, but is not necessarily limited thereto.

In one embodiment, the unit comprising the structure of Chemical Formula 1 may be a unit derived from an acid anhydride and/or a diamine comprising the structure of Chemical Formula 1. Herein, the acid anhydride or the diamine may have a molecular weight of 3000 g/mol or more, 3500 g/mol or more, 4000 g/mol or more, 3000 g/mol to 5500 g/mol, 3500 g/mol to 5000 g/mol, or 4000 g/mol to 5500 g/mol, but is not necessarily limited thereto.

In one embodiment, the polyimide precursor, the polyimide, or the combination thereof may further comprise a unit derived from a diamine represented by the following Chemical Formula 2:

[Chemical Formula 2]

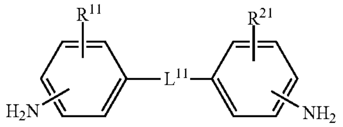

wherein $R^{11}$ and $R^{21}$ are independently of each other hydrogen or a $C_{1-20}$ monovalent organic group;

$L^{11}$ is —$SO_2$—, —O—, or —C(═O)O—, or a $C_{1-20}$ divalent organic group comprising any one or more of these bonds; and Chemical Formula 2 does not comprise a fluorine atom.

In one embodiment, $R^{11}$ and $R^{21}$ may be independently of each other selected from a $C_{1-15}$ monovalent organic group, a $C_{1-10}$ monovalent organic group, a $C_{1-8}$ monovalent organic group, a $C_{1-5}$ monovalent organic group, or a $C_{1-3}$ monovalent organic group, and for example, the organic group may be selected from alkyl, alkenyl, alkynyl, cycloalkyl, heterocycloalkyl, aryl, heteroaryl, oxo (═O), ester, amide, or combinations thereof, but are not necessarily limited thereto.

In one embodiment, $L^{11}$ may be a $C_{1-18}$ divalent organic group, a $C_{1-15}$ divalent organic group, a $C_{1-10}$ divalent organic group, or a $C_{1-6}$ divalent organic group comprising any one or more of —$SO_2$—, —O—, and —C(═O)O—, or may be a combination of any one or more of —$SO_2$—, —O—, and —C(═O)O—and $C_{1-10}$ alkyl, $C_{5-18}$ cycloalkylene, and $C_{6-18}$ arylene, but is not necessarily limited thereto. Also, $L^{11}$ may be, for example, —$SO_2$—, —O—, —C(═O)O—,

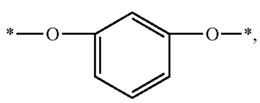
,
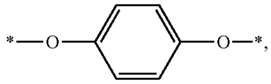
,
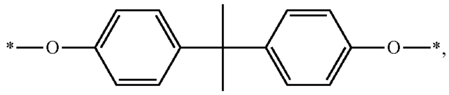
,
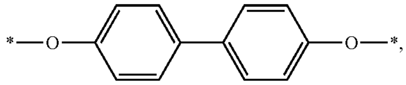
,
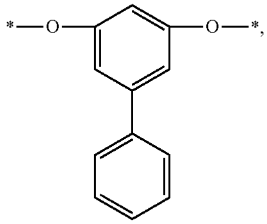
, or

-continued

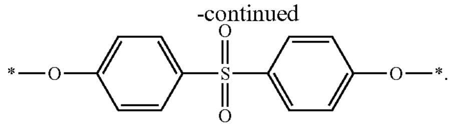
.

In addition, $L^{11}$ may be substituted with a hydroxyl group, a thiol group, a nitro group, a cyano group, $C_{1-10}$ alkyl, $C_{6-20}$ aryl, or $C_{5-20}$ cycloalkyl. However, $L^{11}$ does not comprise a fluorine atom bond.

In one embodiment, the diamine represented by Chemical Formula 2 may comprise or be 4,4'-oxydianiline (ODA), 2,2-bis[4-(4-aminophenoxy)phenyl]propane (BAPP), 4,4'-diaminodiphenyl sulfone (4,4'-DDS), 3,3'-diaminodiphenyl sulfone (3,3'-DDS), 1,3-bis(3-aminophenoxy)benzene (133APB), 1,3-bis(4-aminophenoxy)benzene (134APB), or 1,4-bis(4-aminophenoxy)benzene (144APB). In one embodiment, the polyimide precursor may comprise one or more or two or more of the diamines represented by the structure of Chemical Formula 2 without limitation.

The polyimide precursor, the polyimide, or the combination thereof according to one embodiment comprises the unit comprising the structure of Chemical Formula 1, and also further comprises the unit derived from the diamine represented by Chemical Formula 2, whereby the polyimide film manufactured therefrom is colorless and transparent, residual stress occurring between glass substrates is low, and high adhesion, high mechanical properties, and an appropriate glass transition temperature of about 100° C. to 180° C. may be retained.

In one embodiment, the polyimide precursor, the polyimide, or the combination thereof may further comprise a unit derived from a fluorine-based diamine. The fluorine-based diamine refers to a diamine comprising a fluorine atom. An example of the fluorine-based diamine may comprise 2,2'-bis(trifluoromethyl)benzidine (TFMB), 2,2-bis[4-(4-aminophenoxy)phenyl]hexafluoropropane (HFBAPP), 2,2-bis(4-aminophenyl)hexafluoropropane (BAHF), 2,2'-bis(trifluoromethyl)-4,4'-diaminodiphenylether, 4,4'-bis(4-amino-2-trifluoromethylphenoxy)biphenyl, or 1,4-bis(4-amino-2-trifluoromethylphenoxy)benzene, and the like.

Besides, the polyimide precursor, the polyimide precursor, or the combination thereof may further comprise a unit derived from the diamine commonly used in the art disclosed in the present specification. For example, the unit derived from a diamine may comprise a unit derived from an aromatic diamine, the aromatic diamine may be a diamine comprising at least one aromatic ring, and the aromatic ring may be a single ring, a fused ring of two or more aromatic rings, or a non-fused ring in which two or more aromatic rings are linked by a single bond, a substituted or unsubstituted $C_{1-5}$ alkylene group, O, or C(═O). For example, it may further comprise a unit derived from 2,2-bis(3-amino-4-hydroxyphenyl)-hexafluoropropane (6FAP), p-phenylenediamine (pPDA), m-phenylenediamine (mPDA), p-methylenedianiline (pMDA), or m-methylenedianiline (mMDA).

In one embodiment, the polyimide precursor, the polyimide, or the combination thereof may comprise a unit derived from an acid anhydride commonly used in the art. For example, the acid anhydride may be an acid anhydride comprising an aromatic ring, an acid anhydride comprising an aliphatic ring, a tetracarboxylic acid dianhydride, or a combination thereof. In one embodiment, the acid anhydride may be one or more acid anhydrides selected from the group consisting of ethylene glycol bis(4-trimellitate anhydride) (TMEG-100), 4,4'-oxydiphthalic anhydride (ODPA), 2,2-bis

[4-(2,3-dicarboxyphenoxy)phenyl]propane, 4,4'-(3,4-dicarboxyphenoxy)diphenylsulfide dianhydride), pyromellitic dianhydride (PMDA), 3,3',4,4'-biphenyltetracarboxylic dianhydride (BPDA), 1,2,3,4-cyclobutanetetracarboxylic dianhydride (CBDA), 3,3',4,4'-benzophenonetetracarboxylic dianhydride (BTDA), 4,4'-(4,4'-isopropylidenediphenoxy)bis(phthalic anhydride) (BPADA), 3,3',4,4'-diphenylsulfone tetracarboxylic dianhydride (DSDA), 2,2-bis-(3,4-dicarboxylphenyl) hexafluoropropane dianhydride (6FDA), p-phenylenebis(trimellitate anhydride) (TMHQ), 2,2-bis(4-hydroxyphenyl)propanedibenzoate-3,3',4,4'-tetracarboxylicdianhydride (ESDA), naphthalenetetracarboxylic dianhydride (NTDA), and derivatives thereof.

For example, the acid anhydride may be a compound represented by the following Chemical Formula 4 or 5:

[Chemical Formula 4]

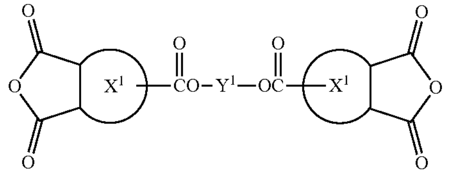

wherein $X^1$ is independently of each other a $C_{3-10}$ aliphatic ring or a $C_{4-10}$ aromatic ring, and $Y^1$ is a linker comprising a single bond, a substituted or unsubstituted $C_{1-20}$ aliphatic chain, a substituted or unsubstituted $C_{3-10}$ aliphatic ring and/or a substituted or unsubstituted $C_{4-10}$ aromatic ring, and specifically, $Y^1$ may comprise two or more $C_{4-10}$ arylene linked by $C_{1-20}$ alkylene, $C_{1-10}$ alkylene, $C_{1-5}$ alkylene, $C_{3-10}$ cycloalkylene, $C_{4-10}$ arylene, two or more $C_{3-10}$ cycloalkylenes linked by $C_{1-20}$ alkylene, or two or more $C_{4-10}$ arylene linked by $C_{1-20}$ alkylene,

[Chemical Formula 5]

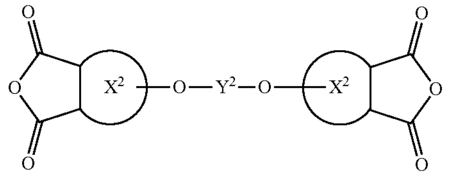

wherein $X^2$ is independently of each other a $C_{3-10}$ aliphatic ring or a $C_{4-10}$ aromatic ring, and $Y^2$ is a linker comprising a single bond, a substituted or unsubstituted $C_{1-20}$ aliphatic chain, a substituted or unsubstituted $C_{3-10}$ an aliphatic ring and/or a substituted or unsubstituted $C_{4-10}$ aromatic ring, and specifically, $Y^2$ may comprise $C_{1-20}$ alkylene, $C_{1-10}$ alkylene, $C_{1-5}$ alkylene, $C_{3-10}$ cycloalkylene, $C_{4-10}$ arylene, two or more $C_{3-10}$ cycloalkylenes linked by $C_{1-20}$ alkylene, or two or more $C_{4-10}$ arylene linked by $C_{1-20}$ alkylene.

Specifically, the acid anhydride may be any one or more of the compound groups represented by the following chemical formulae:

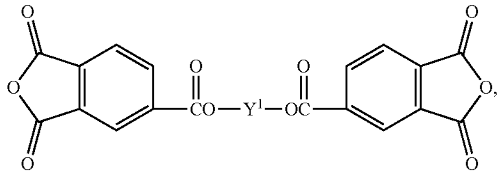

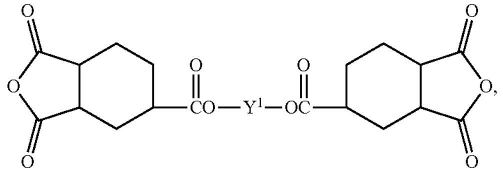

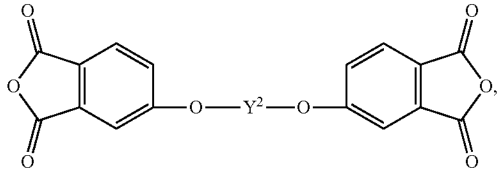

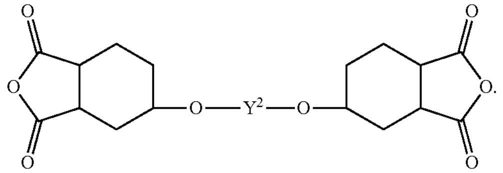

In one embodiment, the acid anhydride may be comprised at about 30 mol % to 70 mol %, 40 mol % to 60 mol %, 45 mol % to 55 mol %, or about 50 mol %, based on the total moles of the monomer of the polyimide precursor. Otherwise, the acid anhydride may be comprised at 20 wt % to 70 wt %, 20 wt % to 60 wt %, 30 wt % to 60 wt %, 20 wt % to 50 wt %, 30 wt % to 50 wt %, or about 40 wt %, based on the total weight of the polyimide precursor, but is not necessarily limited thereto.

The inorganic particles according to one embodiment may be inorganic nanoparticles, and may have an average diameter of, for example, 5 nm to 50 nm, or 5 nm to 30 nm, or 5 nm to 20 nm, but is not necessarily limited thereto.

The average diameter may be measured by, for example, observing particles by an optical microscope, or using scanning electron microscope (SEM), transmission electron microscope (TEM), scanning probe microscope (SPM), scanning tunneling microscope (STM), atomic force microscope (AFM), using a particle size analyzer. For example, it may be obtained by irradiating a composition comprising inorganic particles with laser using a laser particle size analyzer and inferring a particle size from a correlation between diffraction and a particle size. For example, it may be D50, D10, or D90 value. Otherwise, for example, it may be an area average (Ma), a number average (Mn), or a volume average (Mv) value.

In one embodiment, the inorganic particles may comprise silica, zirconium oxide, titanium oxide, zinc oxide, zinc sulfide, chromium oxide, barium titanate, or a combination thereof. The inorganic particles may be mixed with the polyimide resin in the form of being dispersed in an organic solvent, or may be a surface-treated material for improving dispersity. For example, the inorganic particles according to one embodiment may have a surface substituted with a $C_{1-5}$ alkoxy group, and specifically, for example, substituted with a methoxy group or an ethoxy group. Meanwhile, the surface treatment may be performed by adopting a known surface treatment method without limitation, and thus, is not particularly limited.

In one embodiment, the inorganic particles may be chemically bonded to a substituent of the compound represented by Chemical Formula 1. Also, the polyimide precursor composition according to one embodiment comprises the inorganic particles, thereby improving a decrease in surface hardness of a conventional shatterproof layer significantly excellently. Therefore, the shatterproof layer formed from the polyimide precursor composition according to one embodiment comprises the unit represented by Chemical Formula 1, thereby increasing flexibility to relax a thermal expansion-shrinkage behavior and minimizing substrate bending therefrom, and also comprises inorganic particles to improve surface hardness excellently.

In one embodiment, the inorganic particles may be comprised at 1 wt % to 30 wt %, 2 wt % to 25 wt %, 5 wt % to 20 wt %, or 1 wt % to 25 wt %, with respect to the total weight of the polyimide precursor composition, but is not necessarily limited to the range.

In one embodiment, a solid content of the polyimide precursor composition may be 40 wt % or less, 10 wt % to 40 wt %, 35 wt % or less, 30 wt % or less, or 20 wt % to 40 wt %, based on the total weight of the polyimide precursor composition. Herein, the solid content may be a polyamic acid and/or a polyimide.

In one embodiment, the polyimide precursor and/or the polyimide may have a molecular weight of 500 g/mol to 200,000 g/mol or 10,000 g/mol to 100,000 g/mol, and is not necessarily limited thereto.

In one embodiment, the polyimide precursor composition may further comprise any one or more of pigments and dyes of blue series.

A maximum absorption wavelength of the pigments or the dyes of blue series is not particularly limited as long as it is in a range comprising a yellow series wavelength range, but, for example, may be 520 nm to 680 nm, 520 nm to 650 nm, 550 nm to 650 nm, or 550 nm to 620 nm. By using the pigment or dyes having the maximum absorption wavelength in the range described above, the light absorption phenomenon in the blue or violet wavelength of the polyimide film manufactured from the polyimide precursor composition according to one embodiment may be effectively offset and the yellow index may be improved more effectively. Furthermore, by appropriately selecting the maximum absorption wavelength range of the inorganic pigment depending on the type and the composition of monomers used in the preparation of the polyimide precursor composition, or the optical properties of the polyimide film, even the optical properties such as a yellow index, a refractive index, and a retardation in the thickness direction of the film may be made better.

The pigment may be used without a particular limitation as long as it is a blue series pigment or a known pigment having a maximum absorption wavelength of 520 nm to 680 nm, and for example, may be an inorganic pigment comprising natural minerals; or one or more metal selected from zinc, titanium, lead, iron, copper, chromium, cobalt, molybdenum, manganese, and aluminum, or metal oxides thereof. The pigment may be used by being comprised in a pigment dispersion with a dispersing agent.

The inorganic pigment may have an average particle size of nm to 100 nm. Otherwise, the average particle size may be, for example, 50 nm to 100 nm or 70 nm to 100 nm, but is not necessarily limited thereto. The average particle size of the inorganic pigment may be, for example, measured in the dispersion or measured in the polyimide film. Also, for example, the solid phase average particle size before dispersing the pigment may be, for example, nm to 70 nm, for example, 30 nm to 70 nm, or 50 nm to 70 nm.

A means such as ultrasonic waves may be used in the pigment for improving dispersibility, and a dispersing agent may be used. The dispersing agent is not particularly limited as long as it may prevent agglomeration between pigments and improve dispersibility and dispersion stability of the pigment, but for example, may have a functional group having high affinity to a functional group adsorbed to the pigment and a dispersion medium (the organic solvent), and may be determined by adjusting a balance between the two functional groups. As the dispersing agent, various types may be used depending on the surface state of the pigment which is a subject to be dispersed. For example, the pigment dispersing agent according to one embodiment may have an acidic functional group, and in this case, the acidic functional group may be adsorbed to the pigment. The acidic functional group may be, for example, a carboxylic acid.

The dye may be a blue series dye, or a known dye having a maximum absorption wavelength of 520 nm to 680 nm without a particular limitation, and for example, may comprise an acidic dye, a direct dye, a mordant dye, and the like. As a chemical structure, an azo-based dye, a cyanine-based dye, a triphenylmethane-based dye, a phthalocyanine-based dye, an anthraquinone-based dye, a naphthoquinone-based dye, a quinoneimine-based dye, a methine-based dye, an azomethine-based dye, a squarylium-based dye, an acridine-based dyes, a styryl-based dye, a coumarin-based dye, a quinoline-based dye, a nitro-based dye, an indigo-based dye, and the like may be comprised.

In one embodiment, the pigment may be comprised at 10 ppm to 1,500 ppm, or, for example, 100 ppm to 1,500 ppm or 500 ppm to 1,500 ppm, based on the solid content of the polyamic acid and/or the polyimide comprised in the polyimide precursor composition. Herein, the solid content of the polyamic acid and/or the polyimide may refer to a polyamic acid and/or a polyimide.

In one embodiment, the dye may be comprised at 10 ppm to 500 ppm, or, for example, 10 ppm to 300 ppm, 10 ppm to 200, 50 ppm to 200 ppm, or 80 ppm to 200 ppm, based on the solid content of the polyamic acid and/or the polyimide comprised in the polyimide precursor composition. Herein, the solid content of the polyamic acid and/or the polyimide may refer to a polyamic acid and/or a polyimide.

In one embodiment, the polyimide precursor composition may further comprise an additive commonly used in the art disclosed in the present specification, and for example, may further comprise a flame retardant, an adhesive strength improver, an antioxidant, a UV protection agent, or a plasticizer.

In one embodiment, the substrate may be an ultrathin tempered glass (ultrathin glass, UTG). Otherwise, the substrate may be manufactured from, for example, polyester-based resins such as polyethylene terephthalate, polyethylene isophthalate, and polybutylene terephthalate; cellulose-based resins such as diacetyl cellulose and triacetyl cellulose; polycarbonate-based resins; acrylic resins such as polymethyl (meth)acrylate and polyethyl (meth)acrylate; styrene-based resins such as a polystyrene acrylonitrile-styrene copolymer; polyolefin-based resin having a polyethylene, polypropylene, cyclo-based or norbornene structure, polyolefin-based resins such as an ethylenepropylene copolymer; polyimide-based resins; polyamide-based resins; polyethersulfone-based resins; sulfone-based resins, and the like, and these resins may be used alone or in combination of two or more.

In one embodiment, the thickness of the substrate is not particularly limited, and for example, may be 1 μm to 50 μm, 5 μm to 50 μm, 10 μm to 50 μm, 10 μm to 40 μm, 20 μm to 50 μm, 20 μm to 40 μm, or 25 μm to 35 μm.

The term "front surface" used in the present specification may refer to a surface in a direction closer to the user in a lamination structure of the multilayer structure. On the contrary, the term "back surface" may refer to a surface in a direction farther from the user in a lamination structure of the multilayer structure. In the lamination structure according to one embodiment, a display element may be disposed on the backmost surface.

Figure 2:
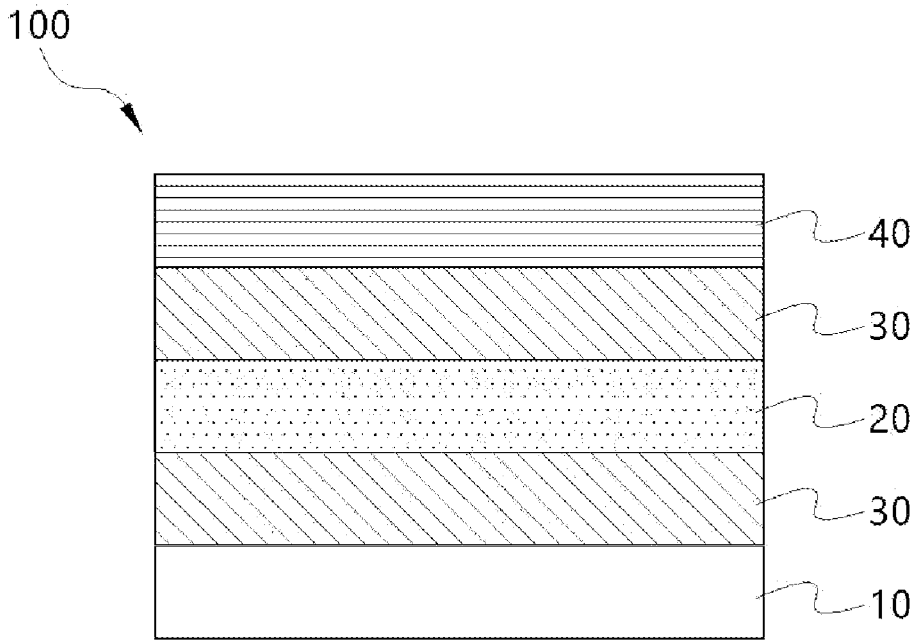

In one embodiment, the shatterproof layer may be formed on only any one surface (for example, formed on a rear surface or a back surface of the substrate) or a front surface and a back surface (both surfaces) of the substrate (FIG. 2).

In one embodiment, when the shatterproof layer is formed on any one surface of the substrate, the shatterproof layer may be formed on one surface (for example, a back surface or a rear surface) of the substrate, and for example, may be formed in contact with one surface of the substrate. In addition, a hard coating layer is formed on the other surface of the substrate on which the shatterproof layer is not formed, and, for example, may be formed on the other surface of the substrate (rear surface lamination). In addition, a display element may be disposed on one surface (for example, the other surface not in contact with the substrate) of the shatterproof layer.

In one embodiment, when the shatterproof layers are formed on both surfaces of the substrate, the optical multilayer structure may be in the form of further comprising the shatterproof layer between the substrate and the hard coating layer in the case of the rear surface lamination.

In this case, the shatterproof layers may be formed, for example, in contact with both surfaces of the substrate. A hard coating layer is formed on any one (for example, a front surface) of the shatterproof layers formed on both surfaces of the substrate. In addition, a display element is disposed on the other surface of the shatterproof layer on which the hard coating layer is not formed.

In the optical multilayer structure according to one embodiment, the shatterproof layer is formed on any one surface of the substrate and the hard coating layer is formed on the other surface of the substrate (rear lamination, FIG. 1), whereby curling and a decrease in surface hardness may be improved excellently as compared with an optical multilayer structure in which the shatterproof layer is formed on any one surface of the substrate and the hard coating layer is formed on the shatterproof layer (one side lamination).

In the optical multilayer structure according to one embodiment, the shatterproof layers are formed on both surfaces of the substrate and the hard coating layer is formed on the shatterproof layer formed (any one layer or one or more layers of the two shatterproof layers), whereby curling and a decrease in surface hardness may be improved excellently as compared with an optical multilayer structure in which the shatterproof layer is formed on any one surface of the substrate and the hard coating layer is formed on the shatterproof layer (one side lamination).

The optical multilayer structure according to one embodiment comprises a polyimide formed from the polyimide precursor composition, thereby minimizing substrate bending and a decrease in surface hardness by an interaction between the hard coating layer and the substrate simultaneously with enhancement of shattering resistant properties.

In one embodiment, the shatterproof layer may have a thickness of, without a particular limitation, for example, 1 μm to 100 μm, 1 μm to 80 μm, 1 μm to 50 μm, 1 μm to 30 μm, 5 μm to 20 μm, or 5 μm to 15 μm, but is not necessarily limited thereto.

In one embodiment, the hard coating layer may be formed by curing a composition for forming a hard coating layer, and also, may be a composite hard coating layer obtained by photocuring and then thermally curing the composition for forming a hard coating layer.

In one embodiment, the hard coating layer may be formed by comprising a condensate of alkoxysilane having an epoxy group, and for example, the condensate of alkoxysilane having an epoxy group may be a siloxane-based resin comprising an epoxy group, but the present disclosure is not necessarily limited thereto. The condensate of alkoxysilane having an epoxy group may have excellent hardness and low bending properties when cured.

The epoxy group may be any one or more selected from a cyclic epoxy group, an aliphatic epoxy group, and an aromatic epoxy group, and the siloxane resin may refer to a polymer compound in which a silicon atom and an oxygen atom form a covalent bond.

In one embodiment, the condensate of alkoxysilane having an epoxy group may be a silsesquioxane resin having an epoxy group, and specifically, a silsesquioxane resin in which a silicon atom is directly substituted with an epoxy group or a substituent of the silicon atom is substituted with an epoxy group, and more specifically, the condensate of alkoxysilane having an epoxy group may be a silsesquioxane resin substituted with 2-(3,4-epoxycyclohexyl)ethyl group, but is not necessarily limited thereto.

In one embodiment, the condensate of alkoxysilane having an epoxy group may have a weight average molecular weight of 1,000 g/mol to 20,000 g/mol, 1,000 g/mol to 18,000 g/mol, or 2,000 g/mol to 15,000 g/mol. When the weight average molecular weight is in the range described above, flowability, coatability, curing reactivity, and the like of the composition for forming a hard coating layer may be further improved.

In one embodiment, the siloxane-based compound having an epoxy group may comprise a repeating unit derived from an alkoxysilane compound represented by the following Chemical Formula 6:

$$R^{61}{}_{n}Si(OR^{62})_{4-n} \quad \text{[Chemical Formula 6]}$$

wherein $R^{61}$ is a straight-chain or branched-chain alkyl group having 1 to 6 carbon atoms substituted with an epoxycycloalkyl group having 3 to 6 carbon atoms or an oxiranyl group, in which the alkyl group may comprise an ether group, $R^{62}$ is a straight-chain or branched-chain alkyl group having 1 to 7 carbon atoms, and n is an integer of 1 to 3.

The alkoxysilane compound represented by Chemical Formula 6 may be, for example, 2-(3,4-epoxycyclohexyl) ethyltrimethoxysilane, 2-(3,4-epoxycyclohexyl)ethyltriethoxysilane, 3-glycidoxypropyltrimethoxysilane, and the like and may be used alone or in combination of two or more, but is not necessarily limited thereto.

In one embodiment, the condensate of alkoxysilane having an epoxy group may be comprised at 20 wt % to 70 wt % or 20 wt % to 50 wt % with respect to the weight of the composition for forming a hard coating layer, but is not necessarily limited thereof.

In one embodiment, the composition for forming a hard coating layer may have excellent flowability and coatability, may be uniformly cured during the curing of the composition for forming a hard coating layer to allow effective prevention of physical defects such as cracks by overcuring, and may show excellent hardness.

In one embodiment, the hard coating layer may have a thickness of 1 μm to 100 μm, 1 μm to 80 μm, 1 μm to 50 μm, 1 μm to 30 μm, 1 μm to 20 μm, or 3 μm to 15 μm, but is not necessarily limited thereto.

In one embodiment, the optical multilayer structure may further comprise an adhesion promoting layer, an antistatic layer, an anti-fingerprint layer, an anti-scratch layer, a low refractive index layer, a low reflection layer, a water repellent layer, an anti-reflection layer, and/or a shock absorption layer, and the like.

The optical multilayer structure according to one embodiment comprises:

a structure in which a shatterproof layer formed by the composition for forming a polyimide shatterproof layer (or a polyimide precursor composition) according to one embodiment is formed on one surface of a substrate and a hard coating layer is formed on the other surface on which the shatterproof layer is not formed; or a structure in which the shatterproof layers are formed on both surfaces of the substrate and the hard coating layer is formed on any one of the shatterproof layers formed (for example, on the shatterproof layer on the front surface), thereby having excellent surface hardness.

The optical multilayer structure according to one embodiment may have a surface hardness of 1H or more. Otherwise, the surface hardness may be, for example, 5H or less, 4H or less, 2H or more, to 5H, 1H to 4H, 1H to 3H, or 2H to 3H. The surface hardness may be an outermost surface hardness of the optical multilayer structure, or a surface hardness of the shatterproof layer and/or the hard coating layer forming the optical multilayer structure. In one embodiment, the surface hardness may be measured by applying a load of a weight of 750 g using a pencil hardness tester, and specifically, may be measured by 10 mm by setting an angle of a pencil and a specimen of about 45° at a speed of 20 mm/min. Herein, the measurement is performed three times per one specimen, and the average surface hardness value may be indicated. In addition, when the number of scratches on the specimen is two or more, it is determined to be poor, but the surface hardness value may refer to a value before being poor.

A structure in which a shatterproof layer formed by the composition for forming a polyimide shatterproof layer (or a polyimide precursor composition) according to one embodiment is formed on one surface of a substrate and a hard coating layer is formed on the other surface on which the shatterproof layer is not formed is comprised; or a structure in which the shatterproof layers are formed on both surfaces of the substrate and the hard coating layer is formed on any one of the shatterproof layers formed (for example, on the shatterproof layer on the front surface) is comprised, thereby improving substrate bending excellently. In one embodiment, when a curl amount is calculated by measuring heights of both ends of the multilayer structure or the substrate (for example, an ultrathin glass substrate) coated with the shatterproof layer from the ground using a ruler (or an average of the values measured, respectively, at both ends is calculated), the value may be 3.0 mm or less, 2.0 mm or less, 1.0 mm or less, 0.5 mm or less, 0.01 mm to 3.0 mm, 0.01 mm to 2.0 mm, 0.01 to 1.0 mm, 0.05 to 0.5 mm, 0.05 mm to 0.2 mm, or about 0.1 mm, but is not necessarily limited thereto.

One implementation provides a method of manufacturing an optical multilayer structure in which a shatterproof layer is laminated on the rear surface.

Specifically, the manufacturing method comprises: applying a composition for forming a shatterproof layer comprising a polyimide precursor composition comprising a polyimide precursor comprising a unit derived from an acid anhydride or a diamine comprising the structure of Chemical Formula 1, and inorganic particles and drying the composition to form a shatterproof layer; and applying a composition for forming a hard coating layer on the other surface of the substrate and curing the composition to form a hard coating layer.

Another implementation provides a method of manufacturing an optical multilayer structure in which shatterproof layers are laminated on both surfaces.

Specifically, the manufacturing method comprises: applying a polyimide precursor composition comprising a unit derived from an acid anhydride or a diamine comprising the structure of Chemical Formula 1 on both surfaces of the substrate(the one surface of the substrate and the other surface of the substrate) and drying the composition to form shatterproof layers; and applying a composition for forming a hard coating layer on any one of the first shatterproof layer or the second shatterproof layer formed on both surfaces of the substrate and curing the composition to form a hard coating layer.

Herein, the polyimide precursor composition according to one embodiment may identically apply to the polyimide precursor composition.

In one embodiment, the shatterproof layer may be formed by applying the composition for forming a shatterproof layer and drying the composition, and the drying may comprise, for example, two drying steps. For example, the drying may comprise first drying at a temperature of about 30° C. to 60° C., 40° C. to 60° C., or 45° C. to 55° C. for about 30 seconds to 120 seconds, 30 seconds to 90 seconds, or 50 seconds to 80 seconds, and then second drying at a temperature of about 150° C. to 300° C., 180° C. to 280° C., 200° C. to 280° C., or 200° C. to 250° C. for about 1 minute to 30 minutes, 1 minute to 20 minutes, 5 minutes to 20 minutes, or 5 minutes to 14 minutes.

In one embodiment, the hard coating layer may be formed by further comprising a crosslinking agent having a polyfunctional epoxy group. Herein, the crosslinking agent may comprise a compound having an alicyclic epoxy group, and for example, the crosslinking agent may comprise a compound having two 3,4-epoxycyclohexyl group bonded, but is not necessarily limited thereto. The crosslinking agent may have a structure and properties similar to the condensate of alkoxysilane having an epoxy group, and in this case, may promote crosslinking of the condensate of alkoxysilane having an epoxy group.

In one embodiment, the hard coating layer may be formed by further comprising a thermal initiator and/or a photoinitiator.

In one embodiment, when a thermal initiator is used in the hard coating layer, a cure half-life may be shortened and thermal curing may be rapidly performed even in low-temperature conditions, and thus, damage and deformation due to a long-term heat treatment under high-temperature conditions may be prevented. The thermal initiator may promote the crosslinking reaction of the epoxy siloxane resin or the crosslinking agent when heat is applied to the composition for forming a hard coating layer. As the thermal initiator, a cationic thermal initiator may be used, but the present disclosure is not necessarily limited thereto.

In addition, when forming the hard coating layer, the thermal curing using a thermal initiator and the photocuring using a photoinitiator are used in combination, thereby improving the curing degree, the hardness, the flexibility, and the like of the hard coating layer. For example, the composition for forming a hard coating layer is applied to a substrate or the like and irradiated with ultraviolet rays (photocuring) to at least partially cure the composition, and then heat is further applied (thermal curing), thereby performing substantially complete curing.

The composition for forming a hard coating layer may be semi-cured or partially cured by the photocuring, and the composition for forming a hard coating layer which has been semi-cured or partially cured may be substantially completely cured by the thermal curing. For example, when the composition for forming a hard coating layer is cured only by the photocuring, a curing time may be excessively extended or curing may not be completely performed in some parts. However, when the photocuring is followed by the thermal curing, the portion which is not cured by the photocuring may be substantially completely cured by the thermal curing, and the curing time may be also reduced.

In addition, generally, a portion which has been already appropriately cured is provided with excessive energy due to an increased curing time (for example, an increased light exposure time), which may cause overcuring. When the overcuring proceeds, the hard coating layer loses flexibility or mechanical defects such as curls or cracks may occur. However, the photocuring and the thermal curing are used in combination, the composition for forming a hard coating layer may be substantially completely cured within a short time and the hardness of the hard coating layer may be further improved while the flexibility of the hard coating layer is maintained.

Though the method of first photocuring and then further thermally curing the composition for forming a hard coating layer has been described above, the sequence of the photocuring and the thermal curing is not particularly limited thereto. That is, in some embodiments, the thermal curing may be first performed and then the photocuring may be performed, of course.

In one embodiment, the thermal initiator may be comprised at 0.1 parts by weight to 20 parts by weight or 1 part by weight to 20 parts by weight with respect to 100 parts by weight of the condensate of alkoxysilane having an epoxy group, but is not necessarily limited thereto. In addition, for example, the thermal initiator may be comprised at 0.01 parts by weight to 15 parts by weight, 0.1 parts by weight to 15 parts by weight, or 0.3 parts by weight to 10 parts by weight with respect to a total of 100 parts by weight of the composition for forming a hard coating layer, but is not necessarily limited thereto.

In one embodiment, the photoinitiator may comprise a photocationic initiator. The photocationic initiator may initiate polymerization of the epoxy siloxane resin and an epoxy-based monomer. As the photo-cationic initiator, an iodonium salt, an onium salt and/or an organic metal salt, and the like may be used, and for example, a diaryliodonium salt, a triarylsulfonium salt, an aryldiazonium salt, an iron-arene composite, and the like may be used alone or in combination of two or more, but the present disclosure is not necessarily limited thereto.

The content of the photoinitiator is not particularly limited, but for example, the photoinitiator may be comprised at 0.1 parts by weight to 15 parts by weight or 1 part by weight to 15 parts by weight with respect to 100 parts by weight of the condensate of alkoxysilane having an epoxy group, but is not necessarily limited thereto.

In addition, for example, the photoinitiator may be comprised at 0.01 parts by weight to 10 parts by weight, 0.1 parts by weight to 10 parts by weight, or 0.3 parts by weight to 5 parts by weight with respect to a total of 100 parts by weight of the composition for forming a hard coating layer, but is not necessarily limited thereto.

In one embodiment, the composition for forming a hard coating layer may further comprise a solvent. The solvent is not particularly limited and may be a solvent known in the art.

A non-limiting example of the solvent may comprise alcohol-based solvents (such as methanol, ethanol, isopropanol, butanol, methyl cellosolve, and ethyl cellosolve), ketone-based solvents (such as methyl ethyl ketone, methyl butyl ketone, methyl isobutyl ketone, diethyl ketone, dipropyl ketone, and cyclohexanone), hexane-based solvents (such as hexane, heptane, and octane), benzene-based solvents (such as benzene, toluene, and xylene), and the like. These may be used alone or in combination of two or more.

In one embodiment, the composition for forming a hard coating layer may further comprise an inorganic filler. The inorganic filler may further improve the hardness of the hard coating layer.

The inorganic filler is not particularly limited, and an example thereof may comprise metal oxides such as silica, alumina, and titanium oxide; hydroxides such as aluminum hydroxide, magnesium hydroxide, and potassium hydroxide; metal particles such as gold, silver, bronze, nickel, and alloys thereof; conductive particles such as carbon, carbon nanotubes, and fullerene; glass; ceramic; and the like, or in terms of compatibility with other components of the composition for forming a hard coating layer, silica may be used, and these may be used alone or in combination of two or more, but the present disclosure is not necessarily limited thereto.

In one embodiment, the composition for forming a hard coating layer may further comprise a lubricant. The lubricant may further improve winding efficiency, blocking resistance, wear resistance, scratch resistance, and the like.

The type of lubricant is not particularly limited, and for example, waxes such as polyethylene wax, paraffin wax, synthetic wax, or montan wax; synthetic resins such as silicon-based resins and fluorine-based resins; and the like may be used, and these may be used alone or in combination of two or more, but the present disclosure is not necessarily limited thereto.

Besides, the composition for forming a hard coating layer may further comprise additives such as, for example, an antioxidant, a UV absorber, a photostabilizer, a thermal polymerization inhibitor, a leveling agent, a surfactant, a lubricant, and an antifouling agent.

In one embodiment, the application may be performed by a die coater, an air knife, a reverse roll, a spray, a blade, casting, gravure, spin coating and the like, but is not necessarily limited thereto.

One implementation provides a window cover film comprising the optical multilayer structure according to one embodiment, and a flexible display panel or a flexible display device comprising the window cover film.

Since the multilayer structure according to one embodiment may have minimized curling and high surface hardness, it may be effectively applied to the window cover film and/or the flexible display panel.

The window cover film may be used as an outermost window substrate of a flexible display device. The flexible display device may be various image display devices such as a common liquid crystal display device, an electroluminescent display device, a plasma display device, and a field emission display device.

Hereinafter, the examples and the experimental examples will be illustrated in detail. However, the examples and the experimental examples described later only illustrate a part of one implementation, and the technology described in the present specification is not construed as being limited thereto.

Example 1

1-1. Preparation of Composition for Forming Shatterproof Layer

An agitator with a nitrogen airflow flowing was filled with 230 g of a mixed solvent of propylene glycol methyl ether (PGME) and cyclohexanone (CHN) at a mass ratio of 8:2. In a state of maintaining the temperature of the reactor at 25° C., 29.0 g of 2,2'-bis(trifluoromethyl)benzidine (TFMB) and 29.6 g of a dimethylsiloxane-diphenylsiloxane (DMS-DPS) oligomer diamine compound (Shin-etsu, X-22-1660B-3, molecular weight: 4,400 g/mol) were added thereto and dissolved. 40.0 g of ethylene glycol bis(4-trimellitate anhydride (TMEG-100) was added thereto and stirring was performed while it was dissolved at 50° C. for 8 hours and at room temperature for 24 hours, thereby preparing a polyamic acid resin. At this time, each monomer had a mole ratio of (TFMB+X-22-1660B-3):TMEG-100=0.99:1.0. Next, silica nanoparticles (diameter: 15 nm) which were dispersed at 30 wt % in N,N-dimethylpropanamide (DMPA) were added at 5 wt % of the total weight of the composition, and stirring was performed for 3 hours, thereby preparing a composition for forming a polyimide-shatterproof layer having a solid content of 23 wt %.

1-2. Preparation of Composition for Forming Hard Coating Layer 2-(3,4-Epoxycyclohexyl)ethyltrimethoxysilane (ECTMS, available from TCI) and water were mixed at a ratio of 24.64 g:2.70 g (0.1 mol:0.15 mol) to prepare a mixture, which was added to a 250 mL 2-neck flask. To the mixture, 0.1 mL of tetramethylammoniumhydroxide (TMAH, available from Aldrich) as a catalyst and 100 mL of tetrahydrofuran (THF, available from Aldrich) were added, and stirring was performed at 25° C. for 36 hours. Thereafter, layer separation was performed, a product layer was extracted with methylene chloride (Aldrich), moisture was removed from the extract with $MgSO_4$, and the solvent was dried under vacuum to obtain an epoxy siloxane-based resin.

30 g of the epoxy siloxane-based resin prepared as described above, 10 g of (3',4'-epoxycyclohexyl)methyl 3,4-epoxycyclohexanecarboxylate and 5 g of bis[(3,4-epoxycyclohexyl)methyl] adipate as a crosslinking agent, 0.5 g of (4-methylphenyl)[4-(2-methylpropyl)phenyl]iodoniumhexafluorophosphate as a photoinitiator, and 54.5 g of methyl ethyl ketone were mixed to prepare a composition for forming a hard coating layer.

1-3. Manufacture of Optical Multilayer Structure

The composition for forming a shatterproof layer prepared above was applied on the back surface of a glass substrate (UTG 30 μm) with a #30 Mayer bar, dried at 50° C. for 1 minute, and dried at 230° C. for 10 minutes to form a polyimide shatterproof layer having a thickness of 10 μm.

Next, the front surface of the glass substrate was coated with the composition for forming a hard coating layer prepared above with a #10 Mayer bar, dried at 60° C. for 5 minutes, irradiated with UV at 1 $J/cm^2$, and cured at 120° C. for 15 minutes to form a hard coating layer having a thickness of 10 μm, thereby manufacturing a UTG optical multilayer structure.

Examples 2 and 3

UTG optical multilayer structures were manufactured in the same manner as in Example 1, except that the silica nanoparticles were added at 10 wt % and 20 wt %, respectively, of the total weight of the composition in the process of preparing the composition for forming a shatterproof layer.

Example 4

4-1. Preparation of Composition for Forming Shatterproof Layer

An agitator with a nitrogen airflow flowing was filled with 188 g of DMPA, and 0.0058 mol of a DMS-DPS oligomer diamine compound (available from Shin-etsu, X-22-1660B-3, molecular weight: 4,340 g/mol) and 0.0502 mol of 1,3-bis(4-aminophenoxy)benzene (TPER) were added at the same temperature and dissolved. 0.0561 mol of TMEG-100 was added at the same temperature thereto, and stirring was performed at 60° C. for 4 hours and then at room temperature for 24 hours, thereby preparing a polyamic acid resin. Next, silica nanoparticles (diameter: 15 nm) dispersed at 30 wt % in DMPA were added at 5 wt % of the total weight of the composition, and stirring was performed for 3 hours, thereby preparing a composition for forming a polyimide-shatterproof layer having a solid content of 23 wt %.

4-2. Preparation of Composition for Forming Hard Coating Layer

ECTMS and water were mixed at a ratio of 24.64 g:2.70 g (0.1 mol:0.15 mol) to prepare a mixture, which was added to a 250 mL 2-neck flask. To the mixture, 0.1 mL of TMAH as a catalyst and 100 mL of THF were added, and stirring was performed at 25° C. for 36 hours. Thereafter, layer separation was performed, a product layer was extracted with methylene chloride, moisture was removed from the extract with $MgSO_4$, and the solvent was dried under vacuum to obtain an epoxy siloxane-based resin.

30 g of the epoxy siloxane-based resin prepared as described above, 10 g of (3',4'-epoxycyclohexyl)methyl 3,4-epoxycyclohexanecarboxylate as a crosslinking agent, 5 g of bis[(3,4-epoxycyclohexyl)methyl] adipate, 0.5 g of (4-methylphenyl)[4-(2-methylpropyl)phenyl] iodoniumhexafluorophosphate, and 54.5 g of methyl ethyl ketone were mixed to prepare a composition for forming a hard coating layer.

4-3. Manufacture of Optical Multilayer Structure

The composition for forming a shatterproof layer prepared above was applied on the back surface of a glass substrate (UTG 30 μm) with a #30 Mayer bar, dried at 50° C. for 1 minute, and dried at 230° C. for 10 minutes to form a polyimide shatterproof layer having a thickness of 10 μm.

Next, the front surface of the glass substrate was coated with the composition for forming a hard coating layer prepared above with a #10 Mayer bar, dried at 60° C. for 5 minutes, irradiated with UV at 1 $J/cm^2$, and cured at 120° C. for 15 minutes to form a hard coating layer having a thickness of 10 μm, thereby manufacturing a UTG optical multilayer structure.

Examples 5 and 6

UTG optical multilayer structures were manufactured in the same manner as in Example 4, except that the silica nanoparticles were added at 10 wt % and 20 wt %, respectively, of the total weight of the composition in the process of preparing the composition for forming a shatterproof layer.

Example 7

7-1. Preparation of Composition for Forming Shatterproof Layer

The process was performed in the same manner as in "1-1. Preparation of composition for forming shatterproof layer" of Example 1.

7-2. Preparation of Composition for Forming Hard Coating Layer

The process was performed in the same manner as in "1-2. Preparation of composition for forming hard coating layer" of Example 1.

7-3. Manufacture of Optical Multilayer Structure

The composition for forming a shatterproof layer prepared above was applied on the front surface of a glass substrate (UTG 30 μm) with a #30 Mayer bar, dried at 50° C. for 1 minute, and dried at 230° C. for 10 minutes to form a first polyimide shatterproof layer having a thickness of 10 μm. Next, a second polyimide shatterproof layer having a thickness of 10 μm was formed on the back surface of the glass substrate in the same manner.

Next, the first polyimide shatterproof layer formed above was coated with the composition for forming a hard coating layer prepared above with a #10 Mayer bar, dried at 60° C. for 5 minutes, irradiated with UV at 1 J/cm$^2$, and cured at 120° C. for 15 minutes to form a hard coating layer having a thickness of 10 μm, thereby manufacturing a UTG optical multilayer structure.

Examples 8 and 9

UTG optical multilayer structures were manufactured in the same manner as in Example 7, except that the silica nanoparticles were added at 10 wt % and 20 wt %, respectively, of the total weight of the composition in the process of preparing the composition for forming a shatterproof layer.

Example 10

10-1. Preparation of Composition for Forming Shatterproof Layer

The process was performed in the same manner as in "4-1. Preparation of composition for forming shatterproof layer" of Example 4.

10-2. Preparation of Composition for Forming Hard Coating Layer

The process was performed in the same manner as in "4-2. Preparation of composition for forming hard coating layer" of Example 4.

10-3. Manufacture of Optical Multilayer Structure

The composition for forming a shatterproof layer prepared above was applied on the front surface of a glass substrate (UTG 30 μm) with a #30 Mayer bar, dried at 50° C. for 1 minute, and dried at 230° C. for 10 minutes to form a first polyimide shatterproof layer having a thickness of 10 μm. Next, a second polyimide shatterproof layer having a thickness of 10 μm was formed on the back surface of the glass substrate in the same manner.

Next, the first polyimide shatterproof layer formed above was coated with the composition for forming a hard coating layer prepared above with a #10 Mayer bar, dried at 60° C. for 5 minutes, irradiated with UV at 1 J/cm$^2$, and cured at 120° C. for 15 minutes to form a hard coating layer having a thickness of 10 μm, thereby manufacturing a UTG optical multilayer structure.

Examples 11 and 12

UTG optical multilayer structures were manufactured in the same manner as in Example 10, except that the silica nanoparticles were added at 10 wt % and 20 wt %, respectively, of the total weight of the composition in the process of preparing the composition for forming a shatterproof layer Comparative Example 1

A UTG optical multilayer structure was manufactured in the same manner as in Example 1, except that the silica nanoparticles were not added in the process of preparing the composition for forming a shatterproof layer.

Comparative Example 2

A UTG optical multilayer structure was manufactured in the same manner as in Example 4, except that the silica nanoparticles were not added in the process of preparing the composition for forming a shatterproof layer.

Comparative Example 3

A UTG optical multilayer structure was manufactured in the same manner as in Example 1, except that the shatterproof layer was formed on the front surface of the substrate and the hard coating layer was formed on the shatterproof layer, instead of forming the shatterproof layer on the back surface of the substrate and forming the hard coating layer on the front surface of the substrate, in the step of preparing an optical multilayer structure.

Comparative Example 4

A UTG optical multilayer structure was manufactured in the same manner as in Example 4, except that the shatterproof layer was formed on the front surface of the substrate and the hard coating layer was formed on the shatterproof layer, instead of forming the shatterproof layer on the back surface of the substrate and forming the hard coating layer on the front surface of the substrate, in the step of preparing an optical multilayer structure.

Comparative Example 5

A UTG optical multilayer structure was manufactured in the same manner as in Example 7, except that the silica nanoparticles were not added in the process of preparing the composition for forming a shatterproof layer.

Comparative Example 6

A UTG optical multilayer structure was manufactured in the same manner as in Example 10, except that the silica nanoparticles were not added in the process of preparing the composition for forming a shatterproof layer.

Experimental Examples

The UTG optical multilayer structures manufactured in the examples and the comparative examples were used to measure the substrate bending properties and surface hardness in the following manner, and the results are shown in the following Table 1.

1. Measurement of Substrate Bending (Curling)

Degrees of curling from the ground of both ends of the UTG optical multilayer structures manufactured in the examples and the comparative examples were measured using a ruler, and a curl amount was calculated as an average value of the values measured at both ends.

2. Surface Hardness Measurement

A load of a weight of 750 g was applied and a pencil hardness was measured, using a pencil hardness tester (available from Ocean Science, COAD.607). An angle of a pencil (available from Mitsubishi) and a specimen was set at 45°, and measured by 10 mm at a speed of 20 mm/min. The measurement was performed three times per one specimen, and when there were two or more scratches, it was determined to be poor, and the surface hardness was indicated as a hardness before being poor.

TABLE 1

| | Content of inorganic particles (wt %) | Curl amount (mm) | Surface hardness |
|---|---|---|---|
| Example 1 | 5 | 0.1 | 2H |
| Example 2 | 10 | 0.1 | 3H |
| Example 3 | 20 | 0.1 | 3H |
| Example 4 | 5 | 0.1 | 2H |
| Example 5 | 10 | 0.1 | 3H |
| Example 6 | 20 | 0.1 | 3H |
| Example 7 | 5 | 0.1 | 1H |
| Example 8 | 10 | 0.1 | 1H |
| Example 9 | 20 | 0.1 | 2H |
| Example 10 | 5 | 0.1 | 1H |
| Example 11 | 10 | 0.1 | 1H |
| Example 12 | 20 | 0.1 | 2H |
| Comparative Example 1 | 0 | 0.1 | HB |
| Comparative Example 2 | 0 | 0.1 | HB |
| Comparative Example 3 | 5 | 0.5 | 1H |
| Comparative Example 4 | 5 | 0.5 | 1H |
| Comparative Example 5 | 0 | 0.1 | 6B |
| Comparative Example 6 | 0 | 0.1 | 6B |

As confirmed from Table 1, the UTG optical multilayer structure of Examples 1 to 12 which comprised silica particles as inorganic particles and had a polyimide shatterproof layer on a rear surface or both surfaces of the substrate had minimized curling and significantly improved surface hardness as compared with the comparative examples. Specifically, the examples had a significantly improved decrease in surface hardness as compared with Comparative Examples 1, 2, 5, and 6 comprising no inorganic particles. In addition, the examples had excellently improved curling and decrease in surface hardness as compared with Comparative Examples 3 and 4 comprising a structure in which the shatterproof layer was formed on the front surface of the substrate and the hard coating layer was formed on the shatterproof layer.

The present disclosure relates to an optical multilayer structure comprising a structure in which a polyimide shatterproof layer formed from a polyimide precursor composition comprising a polyimide precursor comprising a siloxane structure, a polyimide, or a combination thereof, and inorganic particles is formed on any one or both surfaces of a substrate. The optical multilayer structure according to one implementation is less curled to minimize substrate bending and significantly improve surface hardness, and thus, has excellent mechanical properties.

Hereinabove, though an exemplary embodiment has been described in detail by the preferred examples and experimental examples, the range of the embodiment is not limited to specific examples, and should be construed by the appended claims.

The invention claimed is:

1. An optical multilayer structure comprising:

an ultrathin tempered glass (UTG) substrate;

a shatterproof layer which is formed on one surface of the ultrathin tempered glass substrate and comprises a polyimide film comprising a polyimide precursor, a polyimide, or a combination thereof comprising a structure of the following Chemical Formula 1, and inorganic particles; and a hard coating layer formed directly on the other surface of the ultrathin tempered glass substrate:

[Chemical Formula 1]

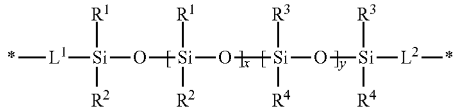

wherein $R^1$ and $R^2$ are independently of each other $C_{1-5}$ alkyl which is unsubstituted or substituted with one or more halogens;

$R^3$ and $R^4$ are independently of each other $C_{6-10}$ aryl which is unsubstituted or substituted with one or more halogens;

$L^1$ and $L^2$ are independently of each other $C_{1-10}$ alkylene; and x and y are independently of each other an integer of 1 or more, wherein a curl amount of opposing ends of the optical multilayer structure is less than 0.5 mm, wherein the curl amount is calculated as an average value of the values measured at each of the opposing ends.

2. The optical multilayer structure of claim 1, wherein the polyimide precursor, the polyimide, or the combination thereof further comprises a unit derived from a diamine represented by the following Chemical Formula 2:

[Chemical Formula 2]

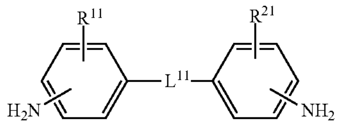

wherein $R^{11}$ and $R^{21}$ are independently of each other hydrogen or a $C_{1-20}$ monovalent organic group;

$L^{11}$ is —$SO_2$—, —O—, or —C(=O)O—, or a $C_{1-20}$ divalent organic group comprising any one or more of these bonds; and Chemical Formula 2 does not comprise a fluorine atom.

3. The optical multilayer structure of claim 1, wherein the polyimide precursor, the polyimide, or the combination thereof further comprises a unit derived from a fluorine-based diamine.

4. The optical multilayer structure of claim 3, wherein the fluorine-based diamine comprises one or more selected from the group consisting of 2,2'-bis(trifluoromethyl)benzidine (TFMB), 2,2-bis[4-(4-aminophenoxy)phenyl]hexafluoropropane (HFBAPP), 2,2-bis(4-aminophenyl)hexafluoropropane (BAHF), 2,2'-bis(trifluoromethyl)-4,4'-diaminodiphenylether, 4,4'-bis(4-amino-2-trifluoromethylphenoxy) biphenyl, 1,4-bis(4-amino-2-trifluoromethylphenoxy) benzene and mixtures thereof.

5. The optical multilayer structure of claim 1, wherein $R^1$ and $R^2$ are independently of each other $C_{1-3}$ alkyl which is unsubstituted or substituted with one or more halogens;

$R^3$ and $R^4$ are independently of each other $C_{6-8}$ aryl which is unsubstituted or substituted with one or more halogens; and $L^1$ and $L^2$ are independently of each other $C_{1-5}$ alkylene.

6. The optical multilayer structure of claim 1, wherein the structure of Chemical Formula 1 is a structure of the following Chemical Formula 3:

[Chemical Formula 3]

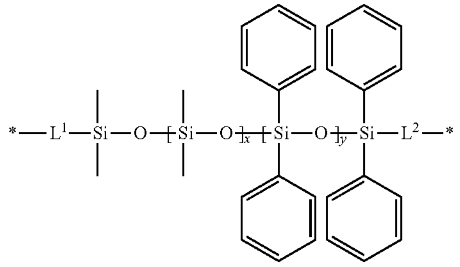

wherein $L^1$ and $L^2$ are independently of each other $C_{1-10}$ alkylene; and x and y are independently of each other an integer of 1 or more.

7. The optical multilayer structure of claim 2, wherein $R^{11}$ and $R^{21}$ are independently of each other hydrogen or a $C_{1-10}$ monovalent organic group; and $L_{11}$ is —$SO_2$—, —O—, or —C(═O)O—, or a $C_{1-15}$ divalent organic group comprising any one or more of these bonds.

8. The optical multilayer structure of claim 2, wherein $L^{11}$ is —$SO_2$—, —O—, or —C(═O)O—, or a combination of any one or more of —$SO_2$—, —O—, or —C(═O)O— and any one or more selected from the group consisting of $C_{1-10}$ alkyl, $C_{5-18}$ cycloalkylene, and $C_{6-18}$ arylene.

9. The optical multilayer structure of claim 1, wherein the inorganic particles comprise silica, zirconium oxide, titanium oxide, zinc oxide, zinc sulfide, chromium oxide, barium titanate, or a combination thereof.

10. The optical multilayer structure of claim 1, wherein the hard coating layer comprises a siloxane-based compound comprising an epoxy group.

11. A method of manufacturing the optical multilayer structure according to claim 1, the method comprising:

applying a polyimide precursor composition on one surface of the ultrathin tempered glass substrate and drying the composition to form a shatterproof layer; and applying a composition for forming a hard coating layer directly on the other surface of the glass substrate and curing the composition to form a hard coating layer.

12. A window cover film comprising the optical multilayer structure according to claim 1.

13. A flexible display panel comprising the window cover film according to claim 12.

14. The optical multilayer structure of claim 1, wherein the inorganic particles comprise silica.

* * * * *